United States Patent
Eisele et al.

(10) Patent No.: US 6,512,198 B2
(45) Date of Patent: Jan. 28, 2003

(54) REMOVAL OF DEBRIS FROM LASER ABLATED NOZZLE PLATES

(75) Inventors: Pete John Eisele, Lexington, KY (US); Brian Christopher Hart, Georgetown, KY (US); Colin Geoffrey Maher, Georgetown, KY (US)

(73) Assignee: Lexmark International, Inc, Lexington, KY (US)

( * ) Notice: Subject to any disclaimer, the term of this patent is extended or adjusted under 35 U.S.C. 154(b) by 16 days.

(21) Appl. No.: 09/855,347

(22) Filed: May 15, 2001

(65) Prior Publication Data

US 2002/0170894 A1 Nov. 21, 2002

(51) Int. Cl.⁷ .............................................. B23K 26/02
(52) U.S. Cl. .............................. 219/121.71; 219/121.83
(58) Field of Search ...................... 219/121.71, 121.7, 219/121.72, 121.68, 121.69, 121.83, 121.67, 121.82; 347/47, 65, 85

(56) References Cited

U.S. PATENT DOCUMENTS

| | | |
|---|---|---|
| 4,764,485 A | 8/1988 | Loughran et al. |
| 5,024,968 A | 6/1991 | Engelsberg |
| 5,093,279 A | 3/1992 | Andreshak et al. |
| 5,151,134 A | 9/1992 | Boquillon et al. |
| 5,151,135 A | 9/1992 | Magee et al. |
| 5,173,442 A | 12/1992 | Carey |
| 5,236,551 A | 8/1993 | Pan |
| 5,296,674 A | 3/1994 | Praschek et al. |
| 5,302,547 A | 4/1994 | Wojnarowski et al. |
| 5,339,737 A | 8/1994 | Lewis et al. |
| 5,454,904 A | 10/1995 | Ghezzo et al. |
| 5,499,668 A | 3/1996 | Katayama et al. |
| 5,531,857 A | 7/1996 | Engelsberg et al. |
| 5,545,902 A | 8/1996 | Pfeiffer et al. |
| 5,580,473 A | 12/1996 | Shinohara et al. |
| 5,814,165 A | 9/1998 | Tatah et al. |
| 5,932,485 A | 8/1999 | Schofield |
| 5,966,633 A | 10/1999 | Koblinger et al. |
| 6,014,542 A | 1/2000 | Hozumi et al. |
| 6,037,103 A | 3/2000 | Hino |
| 6,043,165 A | 3/2000 | Park et al. |
| 6,045,214 A * | 4/2000 | Murthy et al. ................. 347/47 |
| 6,063,695 A | 5/2000 | Lin et al. |
| 6,080,674 A | 6/2000 | Wu et al. |
| 6,388,231 B1 * | 5/2002 | Andrews ................ 219/121.61 |
| 6,402,299 B1 * | 6/2002 | DeMeerleer et al. ........... 347/50 |

FOREIGN PATENT DOCUMENTS

| | | |
|---|---|---|
| JP | 06-339784 | 12/1994 |
| JP | 07-321448 | 12/1995 |
| JP | 08-001357 | 1/1996 |

* cited by examiner

*Primary Examiner*—Tom Dunn
*Assistant Examiner*—Jonathan Johnson
(74) *Attorney, Agent, or Firm*—David E. LaRose; Jacqueline M. Despit

(57) ABSTRACT

A method for forming a nozzle plate for an ink jet printer by laser ablation wherein topographical features are formed by laser ablation and additional ablation pulses are applied to remove debris from the nozzle plate.

11 Claims, 3 Drawing Sheets

REMOVAL OF DEBRIS FROM LASER ABLATED NOZZLE PLATES

FIELD OF THE INVENTION

The invention relates to the manufacture of printheads for ink jet printers. More particularly, the invention relates to the removal of debris from nozzle plates during the manufacture of printheads.

BACKGROUND

Nozzle plates of the type used in ink jet printheads can be made by laser ablating a polyimide material to define ink flow features. During this process, debris, primarily loose polyimide material, may become present on the ablated material and remain after the flow features have been formed. This debris is undesirable, as it may clog the flow features, cause poor adhesion when the nozzle plate is subsequently attached to a heater chip, or be otherwise detrimental to the manufacturing process and function of the resulting printhead.

One common method for removing the debris is by adding a water-soluble sacrificial layer to the topside of the nozzle plate material. The debris lands on this layer and is removed by a high-pressure water spray. However, the desire for faster printers has led to the use of longer heater chips and hence, longer arrays of nozzles. Also, the desire for higher quality print has led to smaller flow features on nozzle plates that are very close together, e.g., <10 $\mu$m. However, for various reasons, water spray techniques are generally unsuitable for cleaning debris from longer plates and/or plates having flow features that are very close together.

Accordingly, there is a need in the art for improvements in the manufacture of printheads and, in particular, in the making of nozzle plates by laser ablation.

SUMMARY OF THE INVENTION

With regard to the foregoing, the invention provides a method for forming a nozzle plate for an ink jet printer by laser ablation.

In a preferred embodiment, the method includes the steps of laser ablating a first portion of a nozzle plate material to partially form topographical flow features on the material. Next, a second portion of the nozzle plate material is ablated to form second topographical features. During this second ablation step, debris generated during ablation can travel to the first portion. Thus, additional ablation is performed to additionally form the first flow features and, in the process, remove debris generated during ablation of the second flow features.

An advantage of the invention is that it enables ablation of longer nozzle plates while avoiding the presence of debris on the finished nozzle plate. For example, debris from the first step of partially forming the first flow features which may land on the second portion is removed during formation of the second flow features. Debris from the formation of the second flow features is removed from the first portion when the first flow features are additionally formed. The debris from the additional formation of the first flow features is substantially negligible. If desired, the ablation may be performed in more than three steps, such that each step produces less and less debris.

In another aspect, the invention relates to a method for forming a nozzle plate for an ink jet printer by laser ablation.

In a preferred embodiment, the method includes the steps of:

(a) laser ablating a nozzle plate material to form topographical features on the nozzle plate material;

(b) providing a mask having an inner open area surrounded by a outer shielded area and positioning the mask on the nozzle plate material so that the topographical features are within the inner open area and surrounded by the outer shielded area; and (c) additionally laser ablating the inner open area of the mask to clean debris from the nozzle plate material, wherein such additional laser ablation causes debris located between one or more of the topographical features to travel away from the topographical features and the inner open area.

This method is particularly suitable for use in removing debris from between flow features of the nozzle plate that are closely spaced relative to one another.

BRIEF DESCRIPTION OF THE DRAWINGS

Further features and advantages of the invention will become apparent by reference to the detailed description when considered in conjunction with the figures, which are not to scale, wherein like reference numbers indicate like elements through the several views, and wherein.

DETAILED DESCRIPTION OF THE INVENTION

The invention is directed toward the manufacture of printheads and, in particular, to a method for forming nozzle plate flow features using a laser ablation technique which removes debris generated during laser ablation of the nozzle plate. The removal of such debris is advantageous so that the debris does not remain to clog flow features and affect subsequent attachment of the nozzle plate to a heater chip.

Figure 1:
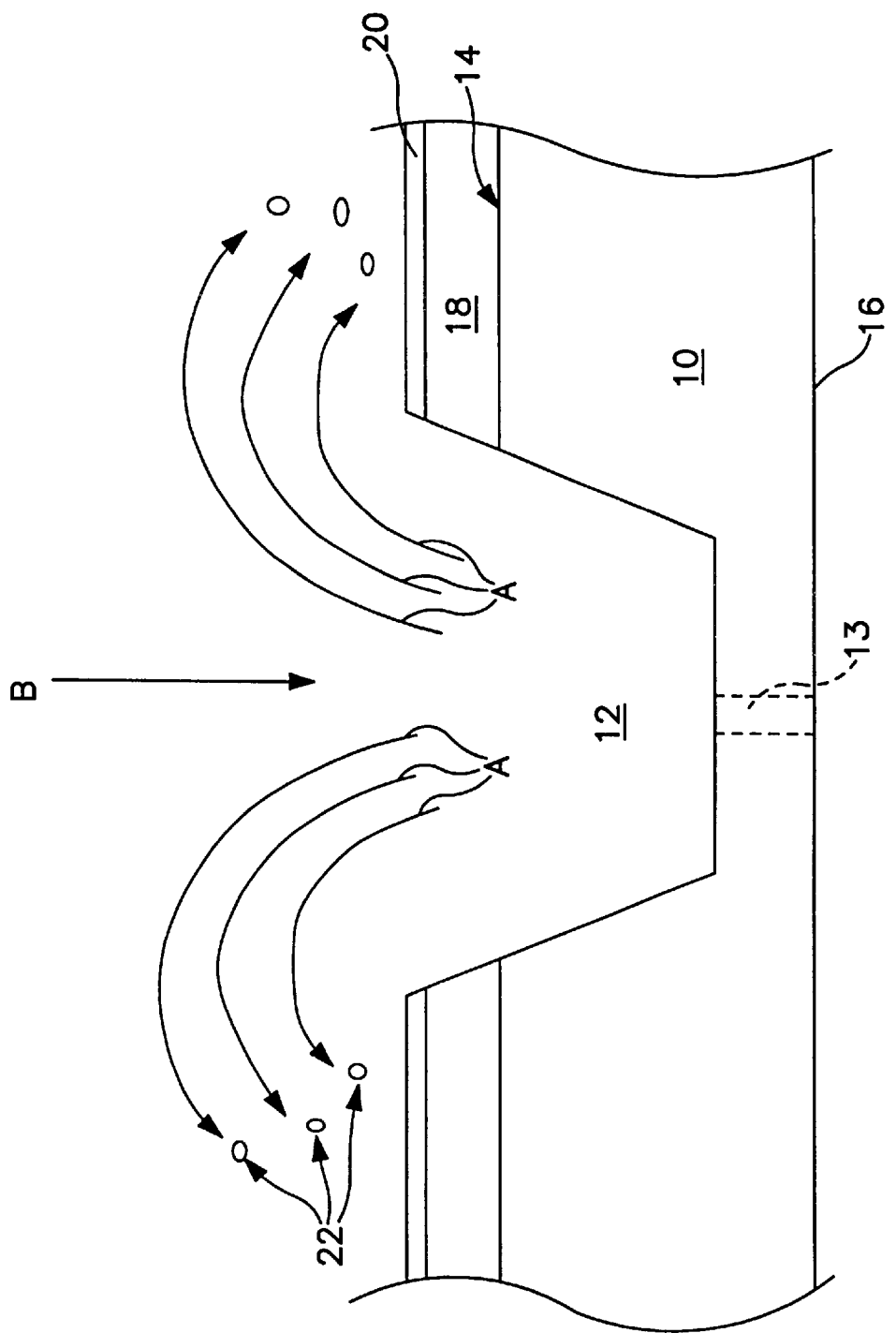
FIG. 1 is a representational cross-sectional view of a portion of a nozzle plate component of an ink jet printhead showing formation of debris during laser ablation of flow features on the nozzle plate.

With reference to FIG. 1, there is shown a polymeric nozzle plate material preferably a polyimide material 10 as it is being ablated by a laser beam, represented generally by beam B, to form flow features, such as channel 12, to provide a nozzle plate. Nozzles or apertures 13 are preferably but not necessarily pre-formed in the material 12 as by a previous laser ablation step.

The polyimide material 10 has an upper surface 14 opposite a lower surface 16. An adhesive layer 18 may be provided on the upper surface 14 prior to the ablation step for use in subsequent attachment of the nozzle plate to a heater chip. The adhesive layer 18 may be protected as by a sacrificial layer, preferably a water-soluble layer 20 such as polyvinyl alcohol or polyethylene oxide.

During ablation of the flow features 12, debris 22 is generated and travels generally away from the channel 12, as represented by arrows A. The debris 22 generally lands on the layer 20, or the adhesive layer 18, or the upper surface 14, whichever is present as the exposed surface. When the sacrificial layer 20 is present, the debris 22 is commonly removed by use of a water spray which removes the sacrificial layer and the debris attached thereto. However, it has been observed that water spray removal alone is not generally suitable to remove debris in the manufacture of nozzle plates having a length greater than about ½ inch and nozzle plates having flow features that are very close together, e.g., generally spaced less than about 10 µm apart from each other.

For example, nozzle plates longer than ½ inch do not fit into the footprint of the laser beam. Thus, to make a 1 inch nozzle plate, a first half is preferably ablated and the plate moved so that the other half can then be ablated. However, ablation of the first half removes its sacrificial layer. Some debris from the ablation of the second half lands on the already ablated first half, which now does not have a sacrificial layer, making such areas generally unsuitable for cleaning by water spray.

Figure 2:
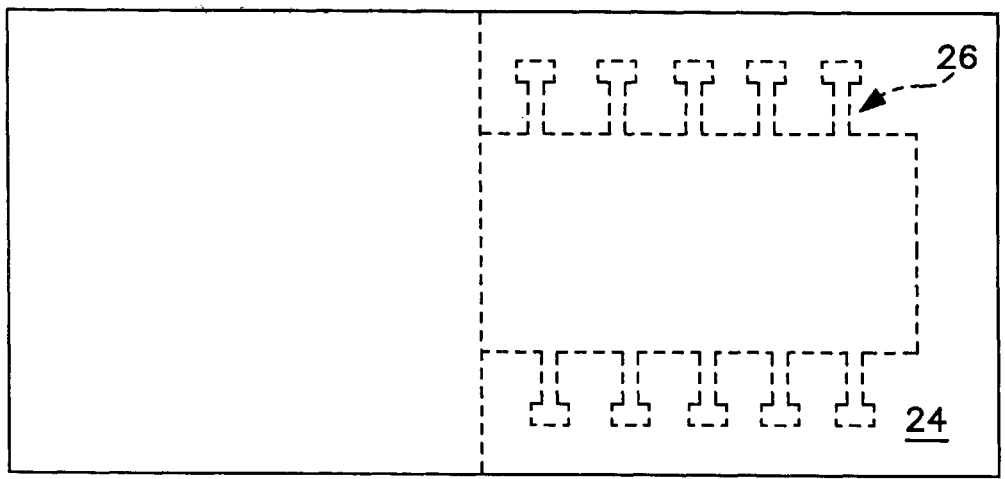
FIG. 2 is a representational planar view showing the partial formation of flow features on a first portion of a nozzle plate in accordance with a preferred embodiment of the method of the present invention.
Figure 3:
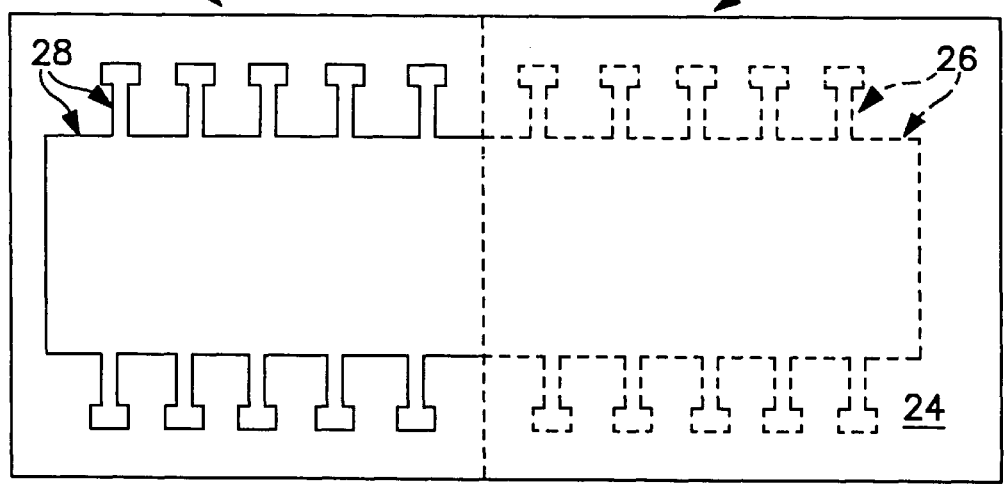
FIG. 3 is a representational planar view of the nozzle plate of FIG. 2 showing subsequent formation of ink flow features on a second portion of the nozzle plate.
Figure 4:
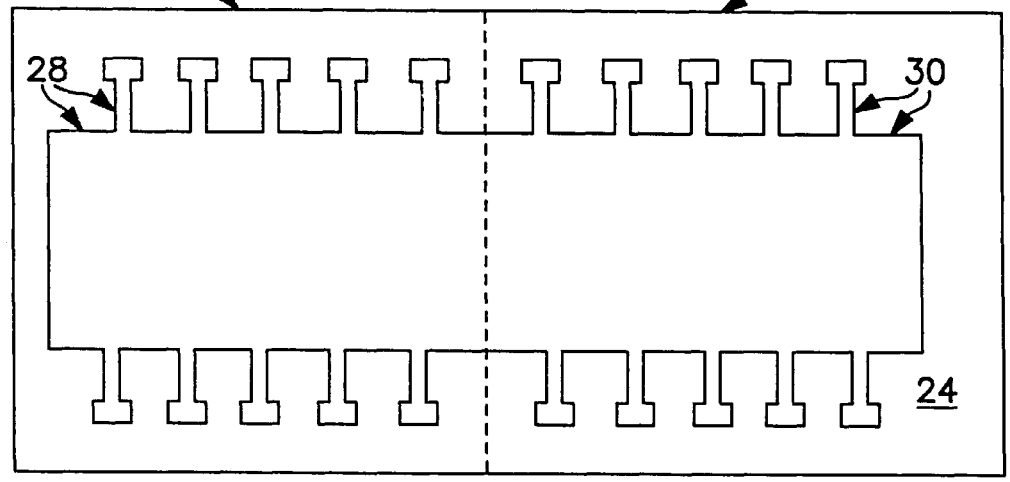
FIG. 4 shows the nozzle plate of FIG. 3 after subsequent treatment of the first portion by laser ablation to further form the previously partially formed flow features of the first portion.

Accordingly, with reference to FIGS. 2–4, there is shown a preferred embodiment for laser ablation of nozzle plates, particularly, nozzle plates longer than ½ inch, which effectively overcomes the disadvantages of conventional techniques. In FIG. 2, there is shown a nozzle plate 24 having a length of about one inch and having partially formed flow features 26 formed on a first half portion 25 thereof, preferably by partially laser ablating the first portion 25 of the nozzle plate 24. Subsequent to the step of FIG. 2, FIG. 3 shows additional, and fully formed, flow features 28 on a second half portion 27 thereof adjacent to the partially formed features 26. Subsequent to the step of FIG. 3, FIG. 4 shows further forming of the previously partially formed flow features 26 into fully formed flow features 30 in first half portion 25 of the nozzle plate 24. Subsequent to fully forming the flow features 28 and 30, a water spray may be used if desired, to remove any remaining sacrificial layer 20 and/or debris from the exposed surface of the nozzle plate 24.

In each of the steps of FIGS. 2–4, the flow features, partial or complete, are formed by laser ablation techniques. The laser is preferably operated with an energy density of 1 joule/cm$^2$, with a laser frequency of up to about 80 Hertz and a wavelength ranging from about 248 to about 308 nanometers (nm).

Returning to FIG. 2, it is noted that the features 26 are only partially formed. This is accomplished by ablating with one or more pulses, preferably one, fewer pulse than is needed to fully form the features 26 on the first portion 25 of the nozzle plate 24. For example n−1 pulses are used to form the flow features shown in FIG. 1, where n ranges from about 200 to about 400 pulses depending on the desired depth of the flow features. Debris formed during this ablation step travels generally away from the first portion 25 and the features 26, some being directed toward the second portion 27 where the features 28 are to be formed. Next, in FIG. 3, the features 28 on the second portion 27 of the nozzle plates are formed using the full requirement of laser beam pulses, i.e., n pulses where n ranges from about 200 to about 400 pulses.

In the process of forming the features 28, the debris present thereon from the formation of the features 26 on the first portion 25 are removed by the laser beam pulses which form the features 28 in the second portion 27, with some of the debris from the formation of the features 28 traveling to the first portion 25. To remove the debris landing on the first portion 25 and, at the same time, to transform the partially formed features 26 into the fully formed features 30, an additional pulse or pulses sufficient to fully form the features 30 is applied to the first portion 25. As will be appreciated, some debris from the formation of the features 30 may travel to the second portion 27 of the nozzle plate adjacent the features 28. However, it has been observed that such debris is substantially negligible when the member of pulses needed to complete flow features 30 is minimized.

In this regard, and in another aspect of the invention, the features 26 could be even less fully formed and the features 28 likewise less than fully formed, with each of the flow features 28 and 30 being additionally ablated in one or more subsequent steps in the described sequence, until all features are fully formed. Increasing the total number of steps would result in a reduction in the amount of debris remaining after the features 30 are fully formed on the first portion 25. However, in each case, the features on the first portion 25 (features 30 for the described embodiment) require at least one more treatment step than do the features on the second portion 27 (features 28 for the described embodiment).

It is further noted that the features 26 could initially be fully formed and then a cleaning pulse applied following the formation of the features 28. However, this is not preferred, as the additional pulse or pulses as represented in the step of FIG. 4 would tend to over-ablate the features 30 in first portion 25 and render them of non-uniform topography with respect to the flow features 28 in the second portion 27.

Figure 5:
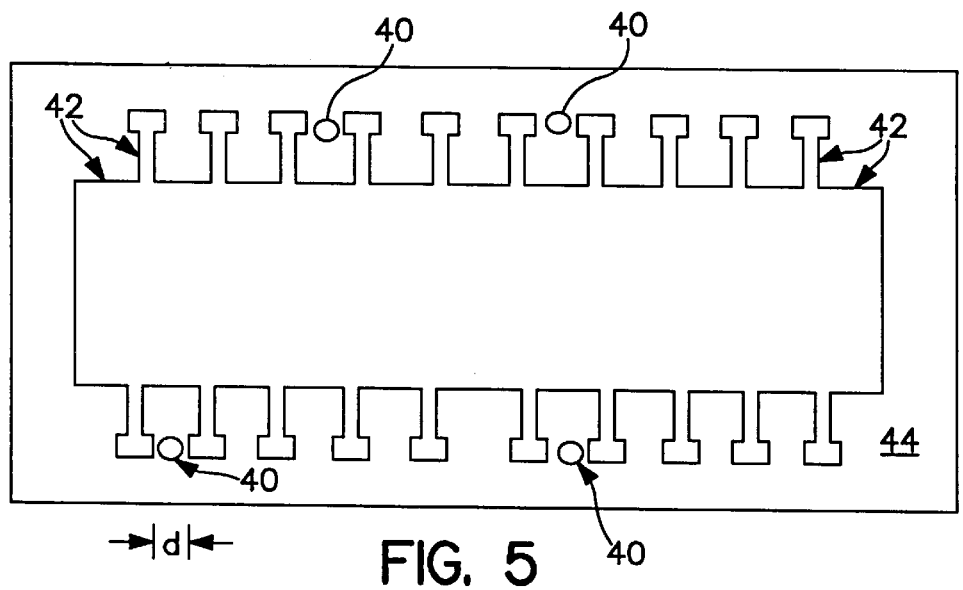
FIG. 5 is a representational view of a nozzle plate showing flow features formed by laser ablation and the deposit of debris between closely adjacent flow features.
Figure 6:
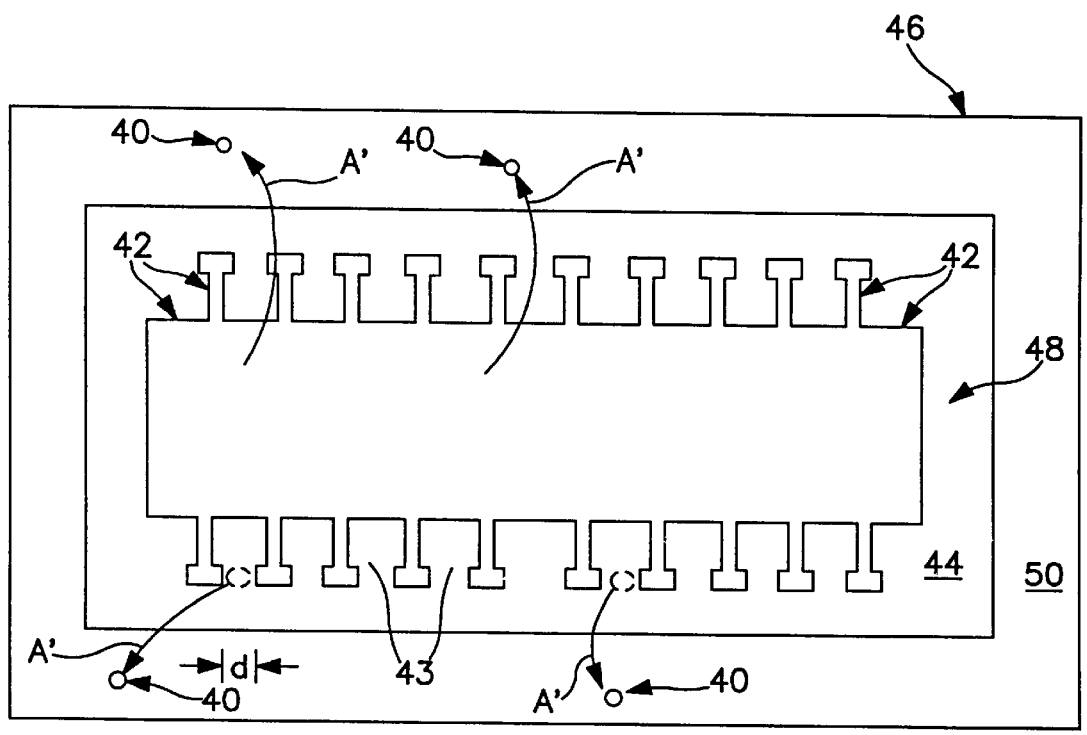
FIG. 6 is a representational view showing removal of debris from the nozzle plate of FIG. 6.

As mentioned previously, it has been observed that water spray removal alone is not generally suitable to remove debris in the manufacture of nozzle plates 24 having flow features that are very closely spaced together, e.g., generally flow features spaced apart less than about 10 µm. With reference now to FIGS. 5 and 6, and in accordance with another aspect of the invention, there is shown a method for removing debris 40 from closely spaced flow features 42, which are spaced apart a distance d of less than about 10 µm, and formed on polymeric material preferably on polyimide material 44. The debris 40 results from the laser ablation of the features 42 and the close proximity of the flow features 42 renders conventional water spray techniques generally unsuitable for removal of debris 40 from these areas.

Accordingly, and with further reference to FIG. 6, a preferably rectangular mask 46 having an inner transparent or open area 48 and an outer shielded or opaque area 50 is provided. The mask 46 is positioned to surround the flow features 42 and a cleaning pulse from the laser is applied to ablate the flow features 42 and the spaces 43 between the features where the debris 40 may be located. As set forth above, the flow features are formed with a laser having an energy density of 1 joule/cm$^2$ with from about 200 to about 400 laser pulses at a frequency of up to 80 Hertz and a wavelength ranging from about 248 to about 308 nm. The cleaning step uses the same laser with the same operating conditions, but with only from 1 to about 5 pulses. This has been observed to effectively remove debris 40 may be from the closely adjacent areas between flow features 42. New debris 40 generated from the cleaning pulse tends to land outside the transparent or inner open area 48 of the mark 46 (as represented generally by arrows A'). The area outside of the transparent or inner open area 48 is less likely to affect the performance of the nozzle plate and more likely to be removed with a water spray cleaning process than debris falling within the open area 48.

The cleaning pulse is sufficiently low level so as to ablate a very thin amount of the flow features 42 preferably less than about 1 micron. Thus, it is suitable to fully form the features prior to the cleaning step. However, if desired, the features may initially be less than fully formed, with their full formation occurring during the cleaning step.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for forming a nozzle plate for an ink jet printer by laser ablation, the method comprising the steps of:

laser ablating a first portion of a nozzle plate material to partially form first topographical features on the nozzle plate material, laser ablating a second portion of the nozzle plate material to form second topographical features on the nozzle plate material, wherein the second topographical features are more fully formed than the first topographical features; and additionally laser ablating the first portion of the nozzle plate material to additionally form the first topographical features.

2. The method of claim 1, wherein the nozzle plate material is greater than one-half inch in length.

3. The method of claim 1, wherein the second topographical features are substantially fully formed and the additional ablation substantially fully forms the first topographical features.

4. A method for forming a nozzle plate for an ink jet printer by laser ablation, the method comprising the steps of:

placing a first portion of a nozzle plate material adjacent a laser beam for ablation of first topographical features on the nozzle plate material and forming the first topographical features by applying fewer pulses of the laser beam than is required to fully form the first topographical features;

placing a second portion of the nozzle plate material adjacent the laser beam for ablation of second topographical features on the nozzle plate material and applying sufficient pulses of the laser beam to the second portion to substantially fully form the second topographical features; and placing the first portion of the nozzle plate material adjacent the laser beam for additional ablation of the first topographical features and applying one or more additional pulses to the first portion to substantially fully form the first topographical features.

5. The method of claim 4, wherein the nozzle plate material is greater than one-half inch in length.

6. The method of claim 4, wherein the additional ablation of the first topographical features also functions to substantially remove debris from the first portion of the nozzle plate material.

7. A method for forming a nozzle plate for an ink jet printer by laser ablation, the method comprising the sequential steps of:

placing a first portion of a nozzle plate material adjacent a laser beam for ablation of first topographical features on the nozzle plate material and applying fewer pulses of the laser beam than is required to fully form the first topographical features;

placing one or more second portions of the nozzle plate material adjacent the laser beam for ablation of second topographical features on the nozzle plate material, wherein sufficient pulses of the laser beam are applied to substantially fully form the second topographical features wherein as a result of the formation of the second topographical features debris is generated and conveyed onto the first portion of the nozzle plate material; and placing the first portion of the nozzle plate material adjacent the laser beam for additional ablation of the first topographical features, wherein one or more additional pulses are applied to substantially fully form the first topographical features and to substantially remove the debris from the first portion of the nozzle plate.

8. A method for forming a nozzle plate for an ink jet printer by laser ablation, the method comprising the steps of:

(a) laser ablating a nozzle plate material to form topographical features on the nozzle plate material, (b) providing a mask having an inner transparent or open area surrounded by a outer shielded or opaque area and positioning the mask on the nozzle plate material so that the topographical features are within the inner transparent or open area and surrounded by the outer shielded or opaque area; and (c) additionally laser ablating the inner transparent or open area of the mask to clean debris from the nozzle plate material, wherein such additional laser ablation causes debris located between one or more of the topographical features to travel away from the topographical features and the inner transport or open area.

9. The method of claim 8, wherein the topographical features of step (a) are not fully formed.

10. The method of claim 8, wherein the topographical features of step (a) are fully formed.

11. The method of claim 8, wherein the topographical features are spaced less than about 10 $\mu$m from one another.

* * * * *